United States Patent
Hwang et al.

(10) Patent No.: US 8,788,151 B2
(45) Date of Patent: Jul. 22, 2014

(54) VEHICLE AND METHOD OF IDENTIFYING PASSENGER OF THE SAME

(75) Inventors: Jae Ho Hwang, Gyeonggi-do (KR);
Byung Hyuk Park, Yongin-si (KR);
Byung Yeol Kim, Yongin-si (KR);
Young Soo Hwang, Suwon-si (KR)

(73) Assignee: Hyundai Mobis Co., Ltd, Yongin-si, Gyeonggi-do (KR)

( * ) Notice: Subject to any disclaimer, the term of this patent is extended or adjusted under 35 U.S.C. 154(b) by 417 days.

(21) Appl. No.: 12/851,650

(22) Filed: Aug. 6, 2010

(65) Prior Publication Data
US 2011/0270492 A1 Nov. 3, 2011

(30) Foreign Application Priority Data
May 3, 2010 (KR) ........................ 10-2010-0041461

(51) Int. Cl.
*B60R 22/00* (2006.01)
*E05F 15/00* (2006.01)
*G06F 7/00* (2006.01)
*G05D 3/00* (2006.01)
*B60R 21/16* (2006.01)
*B60R 21/00* (2006.01)
*B60D 1/28* (2006.01)

(52) U.S. Cl.
USPC .............................. 701/45; 280/734; 180/271

(58) Field of Classification Search
CPC ...... B60R 21/00; B60R 21/015; B60R 21/16;
B60R 2021/0152; B60R 2021/0155; B60R 2021/01516; B60R 2022/4816; B60N 2/002
USPC ........ 136/132; 180/270–290; 280/728.1, 734;
280/735; 340/436; 701/36, 45; 177/136
See application file for complete search history.

(56) References Cited

U.S. PATENT DOCUMENTS

| 5,184,845 | A | * | 2/1993 | Omura .......................... 280/735 |
| 6,043,736 | A | * | 3/2000 | Sawahata et al. ............. 340/438 |
| 6,636,792 | B2 | * | 10/2003 | Lichtinger et al. ............. 701/45 |
| 7,830,270 | B1 | * | 11/2010 | Philbert ........................ 340/667 |
| 2003/0060957 | A1 | * | 3/2003 | Okamura et al. ............... 701/45 |
| 2003/0168895 | A1 | * | 9/2003 | Sakai et al. ............. 297/216.12 |
| 2004/0045758 | A1 | * | 3/2004 | Breed et al. ................... 180/271 |
| 2004/0045759 | A1 | * | 3/2004 | Kiribayashi .................. 180/271 |
| 2005/0216158 | A1 |   | 9/2005 | Sakai |
| 2006/0044126 | A1 | * | 3/2006 | Ho et al. ........................ 340/457 |
| 2006/0044127 | A1 | * | 3/2006 | Ho et al. ........................ 340/457 |
| 2006/0217862 | A1 |   | 9/2006 | Sakai et al. |

(Continued)

FOREIGN PATENT DOCUMENTS

| JP | 2006-264366 | 10/2006 |
| JP | 2007-055556 | 3/2007 |
| KR | 10-2006-0044611 | 5/2006 |

*Primary Examiner* — Khoi Tran
*Assistant Examiner* — Abby Lin
(74) *Attorney, Agent, or Firm* — Sherr & Jiang, PLLC

(57) ABSTRACT

A vehicle according to the present invention includes: a weight sensor disposed in a seat to sense the weight of a passenger sitting on the seat; a weight-keeping-exerted time measurer measuring how long the weight of the passenger sensed by the weight sensor is exerted; a vehicle speed sensor sensing the traveling speed; and a passenger identification unit setting the class of the seat by using the passenger's weight sensed by the weight sensor and the weight-keeping-exerted time measured by the weight-keeping-exerted time measurer and finally fixing the set class, when the traveling speed sensed by the vehicle speed sensor is a fixed reference speed or more.

5 Claims, 4 Drawing Sheets

(56) References Cited

U.S. PATENT DOCUMENTS

| | | | |
|---|---|---|---|
| 2007/0135982 A1* | 6/2007 | Breed et al. | 701/36 |
| 2009/0071265 A1* | 3/2009 | Hwang et al. | 73/862.53 |
| 2009/0151477 A1* | 6/2009 | Hwang et al. | 73/862.621 |
| 2010/0138113 A1* | 6/2010 | Lee et al. | 701/45 |

* cited by examiner

VEHICLE AND METHOD OF IDENTIFYING PASSENGER OF THE SAME

BACKGROUND OF THE INVENTION

1. Field of the Invention

The present invention relates to a method of identifying a passenger of a vehicle.

2. Description of the Related Art

In general, vehicles are equipped with seats therein for passengers. The driver seat or passenger seats are equipped with various passenger identification devices that can classify the types of passenger, determine whether passengers seat on the seats, and whether the seat belts are fastened, when the passengers sit on the seats.

Pattern recognition type, pressure recognition type, and weight recognition type passenger identification devices are widely used, in which according to the pattern recognition type, a sensor mat is disposed on the seats of a vehicle and pressure sensors are arranged in a matrix on the sensor mat, such that it identifies the passenger by recognizing the weight and the pelvis pattern of the passenger on the seat.

According to the pressure recognition type, a thin bladder filled with liquid and a pressure sensor are mounted to the lower side of the seat cushion, such that the pressure sensor senses liquid leaking out from the bladder when a passenger sits on the seat, thereby identifying the passenger.

According to the weight recognition type, a strain gauge is mounted where a seat frame on the seat is mounted, such that the passenger sitting on the seat is identified by sensing the weight of the passenger.

However, even if various passenger identification devices described above are used, when passenger sits at a side of the seat or sits in an abnormal position, various identification errors occur, for example, it is determined that there is no passenger on the seat or a small adult is identified as a child.

When an adult is identified as a child due to an identification error, an airbag inflates to fit to the body shape of the child, such that the adult, the passenger, cannot be safely protected and may be secondarily injured by the airbag.

Further, when it is determined that there is no passenger on the seat, the airbag does not operate and the actual passenger may be seriously damaged, and as a result, many problems are caused by errors in passenger identification.

SUMMARY OF THE INVENTION

The present invention has been made in effort to overcome the problems on the related art and it is an object of the present invention to prevent errors in passenger identification by using not only the weight of a passenger sensed from a device mounted on the seat where the passenger sits, but various information of a vehicle which can be sensed after the passenger sits.

According to an exemplary embodiment of the present invention, a vehicle includes: a weight sensor disposed in a seat to sense the weight of a passenger sitting on the seat; a weight-keeping-exerted time measurer measuring how long the weight of the passenger sensed by the weight sensor is exerted; a vehicle speed sensor sensing the traveling speed; and a passenger identification unit setting the class of the seat by using the passenger's weight sensed by the weight sensor and the weight-keeping-exerted time measured by the weight-keeping-exerted time measurer and finally fixing the set class, when the traveling speed sensed by the vehicle speed sensor is a fixed reference speed or more.

The method of identifying a passenger includes: a first step of sensing the weight of a passenger in a seat and measuring how long the passenger's weight is exerted; a second step of setting the class of the seat by using the sensed weight of the passenger and the measured weight continuance time; and a third step of finally fixing the class set in the second step, when the traveling speed of the vehicle is higher than a fixed reference speed.

According to the method of identifying a passenger having the above configuration of the present invention, it is possible to accurately identify a passenger sitting in a seat by using information obtained from the weight of the passenger on the seat and the vehicle speed, whether the seat belt is fastened, and whether the vehicle door is opened or closed, and minimize errors in identifying the types of passengers.

Since the airbag deployed in a collision receives accurately identified value, it is possible to more safely protect a passenger by deploying the airbag to fit to the passenger and prevent the passenger from being additionally hurt due to incorrect deployment of the airbag.

DETAILED DESCRIPTION OF THE PREFERRED EMBODIMENTS

Exemplary embodiments of the present invention are described in detail with reference to the accompanying drawings.

Figure 1:
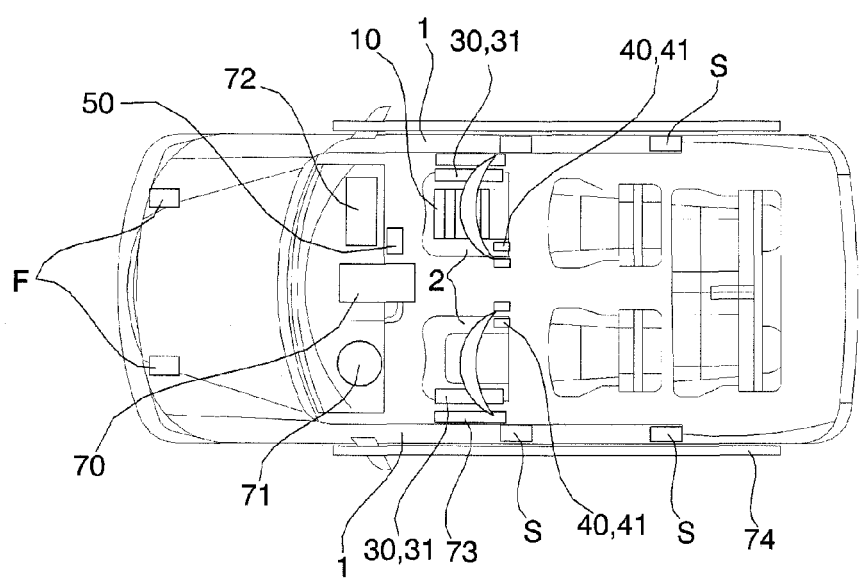
FIG. 1 is a perspective view schematically showing a vehicle according to an exemplary embodiment of the present invention.
Figure 2A:
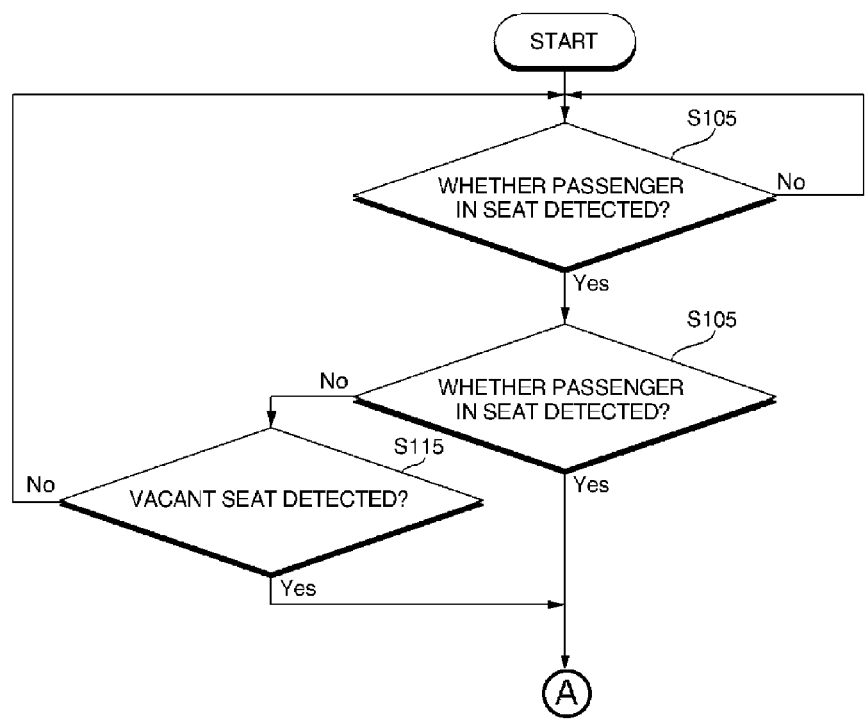
FIGS. 2A and 2B are flowcharts illustrating the process of passenger identification operation of a vehicle according to an exemplary embodiment of the present invention.
Figure 2B:
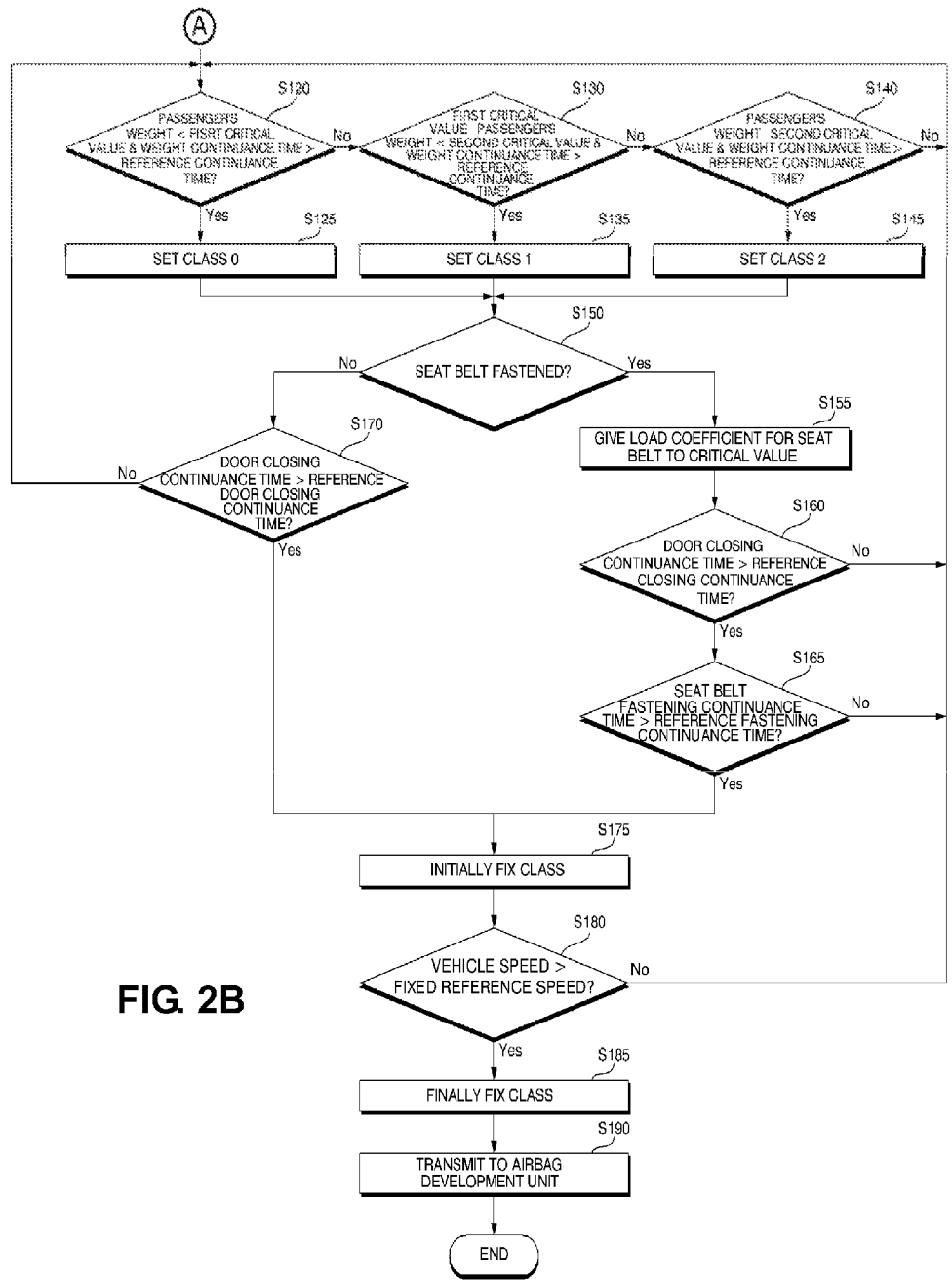
Figure 3:
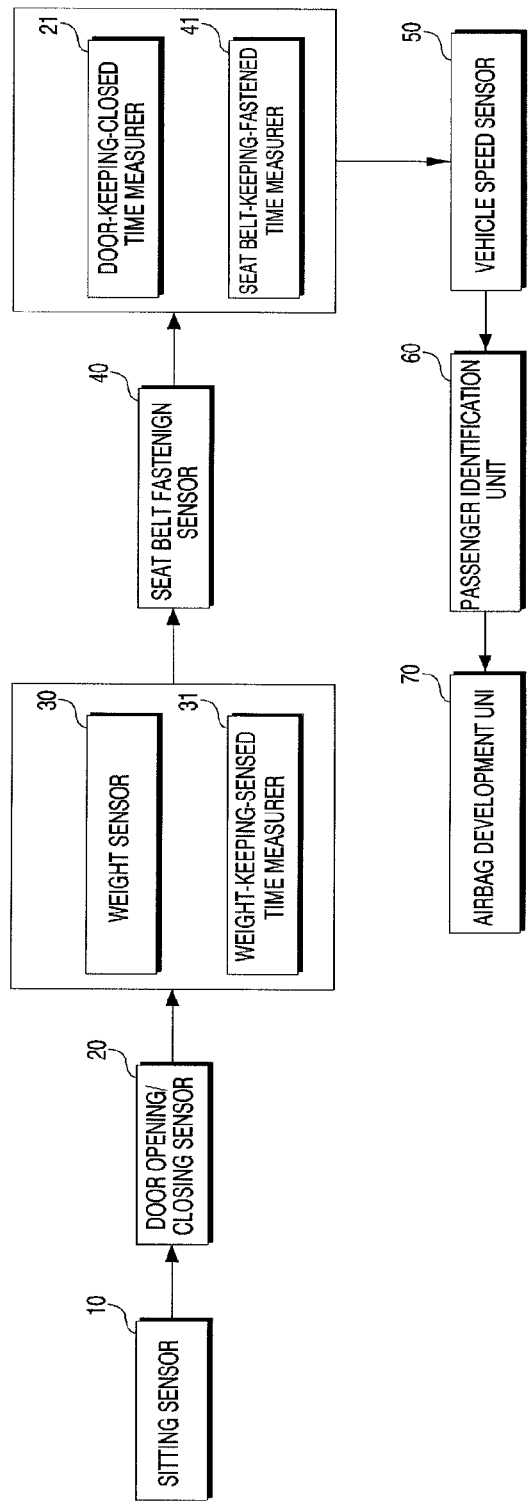
FIG. 3 is a block diagram according to the embodiment of FIG. 1.

FIG. 1 is a perspective view schematically showing a vehicle according to an exemplary embodiment of the present invention. FIGS. 2A and 2B are flowcharts illustrating the process of passenger identification operation of a vehicle according to an exemplary embodiment of the present invention. FIG. 3 is a block diagram according to the exemplary embodiment of FIG. 1.

Referring to FIGS. 1 to 3, in order to achieve the objects described above, a vehicle according to an exemplary embodiment of the present invention includes: a weight sensor 30 disposed in a seat 2 to sense the weight of a passenger sitting on the seat 2; a weight-keeping-exerted time measurer 31 which measures the time that the weight of the passenger sensed by the weight sensor 30 is exerted; a vehicle speed sensor 50 which senses the traveling speed of the vehicle; a passenger identification unit 60 which initially sets the class of the seat 2 by using the passenger's weight sensed by the weight sensor 30 and the weight-keeping-exerted time measured by the weight-keeping-exerted time measurer 31 and which finally fixes the set class, when the traveling speed sensed by the vehicle speed sensor 50 is a fixed reference speed or more.

The fixed reference speed is a reference in finally fixing the class set by the passenger identification unit 60 and the fixed reference speed is set to a speed where the vehicle is sensed as being traveling on the road.

The vehicle is equipped with front collision sensors F and a side collision sensors S. When a collision occurs while the vehicle travels, the front and side collision sensors sense the collision at the front and the sides of the vehicle.

Further, various types of air bags 71, 72, 73, and 74 are provided to protect the passengers in the vehicle. The airbags provided in the vehicle include a driver airbag 71 provided to protect the driver driving the vehicle, a passenger airbag 72 for protecting the passenger on the passenger seat, and a side airbag 73 and a curtain airbag 74 for protecting the sides of the driver, the passenger, and the others on the backseat.

The vehicle is equipped with an airbag-deployment unit 70 that can adjust the deployment of the various airbags, such that when the traveling speed of the vehicle is higher than the fixed reference speed and the passenger identification unit 60 finally fixes the set class, the airbag-deployment unit 70 adjust the deployment size of the airbags 71, 72, 73, and 74 in accordance with the fixed class.

The vehicle has a door 1 to prevent the passenger on the seat 2 from getting out of the vehicle and the door 1 is equipped with a door opening/closing sensor 20 that senses whether the door 1 is open or closed.

The door 1 is further equipped with a door-keeping-closed time measurer 21 that measures how long the door 1 has been closed, when it is sensed by the door opening/closing sensor 20 that the door 1 was closed after the passenger sit on the seat.

The passenger identification unit 60 fixes the set class when it is sensed that the door 1 is closed and the door-keeping-closed time measured by the door-keeping-closed time measurer 21 is longer than a reference closing time.

Other than the airbags 71, 72, 73, and 74, a seat belt (not shown) is provided as a device for protecting the passenger on the seat 2 in the vehicle, and a seat belt-fastening sensor 40 that senses whether the passenger fastened the seat belt is provided to the seat belt.

The passenger identification unit 60 changes a critical value that is a reference for setting the class, when it is sensed by the seat belt-fastening sensor 40 that the passenger fastened the seat belt.

Further, the seat belt is further equipped with a seat belt-keeping-fastened time measurer 41 that measures how long the seat belt has been fastened, when the seat belt-fastening sensor 40 senses that the passenger fastened the seat belt.

Further, when it is sensed that the passenger fastened the seat belt and the seat belt-keeping-fastened time measured by the seat belt-keeping-fastened time measurer 41 is longer than a reference time, the passenger identification unit 60 fixes the set class.

Meanwhile, the door-keeping-closed time measurer 21 measuring how long the door 1 has been closed and the seat belt-keeping-fastened time measurer 41 measuring how long the seat belt has been fastened may be implemented by not only hardware, but software.

When implemented by hardware, they may be timers to directly count the continuance time, whereas when implemented by software, they are programmed in the passenger identification unit 60 and can measure the continuance time by collecting and analyzing data related to the continuance time, such as electronic signals, instead of directly measuring the continuance time.

The class set by the passenger identification unit 60 shows conditions of the seat 2 and includes a class 0 where it is recognized that there is no passenger on the seat 2, a class 1 where it is recognized that the passenger on the seat 2 is a child, and a class 2 where it is recognized that the passenger on the seat 2 is an adult.

The process of operation that identifies a passenger by the vehicle described above is as follows.

A method of identifying a passenger of a vehicle basically includes: a first step of sensing the weight of a passenger on the seat 2 in the vehicle and measuring how long the passenger's weight is exerted; a second step of setting the class of the seat 2 by using the sensed weight of the passenger and the measured weight continuance time; and a third step of finally fixing the class set in the second step, when the traveling speed of the vehicle is a fixed reference speed or higher than the fixed reference speed.

A step where the first step is executed is not shown in the flowcharts of FIGS. 2A and 2B, because the first step of sensing the weight of a passenger and measuring the continuance time of the sensed weight of the passenger is automatically executed in a step requiring the passenger's weight and information that how long the sensed weight of the passenger has been exerted from when it is sensed that the passenger sits on the seat 2.

The vehicle performs the step of sensing whether a passenger sits on the seat 2 to identify the passenger on the seat 2 (S105). The step of sensing whether a passenger sits on the seat, senses whether a passenger sits on the seat, using a sitting sensor 10, and when it is sensed that there is no passenger on the seat in this step, continuously performs the step of sensing whether a passenger sits on the seat until it senses that a passenger sits on the seat.

On the other hand, in the step of sensing whether a passenger sits on the seat, it is performed to sense whether the door 1 is opened or closed to check that the door 1 is opened or closed when it is sensed that a passenger sits on the seat 2 (S110). Further, the door 1 is equipped with the door opening/closing sensor 20 that senses whether the door 1 is opened or closed.

When it is sensed that the door is open by the door opening/closing sensor 20, a step of sensing whether there is no person on the seat 2 is performed (S115). The information on the passenger's weight sensed by the weight sensor 20 and the passenger's weight continuance time measured by the weight-keeping-exerted time measurer 21 is used to perform the step of sensing that the seat 2 is vacant.

When the sensed passenger's weight and the measured weight continuance time is smaller than a first critical value, which is a condition for setting class 0 (described below) and the reference continuance time is 5 seconds or more, this corresponds to a vacant seat weight range (class 0) where it is recognized that there is no passenger on the seat 2; therefore, the process returns to the step of sensing whether a passenger sits on the seat.

However, when the passenger's weight sensed by the weight sensor 20 is more than the vacant seat weigh range (class 0) where it is recognized that there is no passenger on the seat, the second step of setting the class of the seat 2 by using the sensed passenger's weight and the measured weight continuance time is performed.

On the other hand, even if it is sensed that the door 1 is closed by the door opening/closing sensor 20, the second step in which the passenger identification unit 60 sets the class of the seat 2, using the passenger's weight sensed by the weight sensor 30 and the passenger's weight continuance time measured by the weight-keeping-exerted time measurer 31, is performed.

The class set in the second step includes class 0 that recognizes that there is no passenger on the seat 2, class 1 that recognizes that the passenger on the seat 2 is a child, and class 2 that recognizes that the passenger on the seat 2 is an adult.

A critical value is included to set the class on the basis of the passenger's weight sensed by the weight sensor 30 and the passenger's weight continuance time measured by the weight-keeping-exerted time measurer 31 in the second step, in which the critical value includes a first critical value for discriminating class 0 from class 1, a second critical value for discriminating the class 1 from class 2, and a reference continuance time that is the reference for the sensed passenger's weight continuance time.

The critical values and the reference continuance time may be freely determined by a user for optimal passenger identification. According to an embodiment of the present invention, the first critical value for discriminating class 0 from class 1 is set to 10 kg, the second critical value for discriminating the class 1 from class 2 is set to 35 kg, and the reference continuance time for each critical value is set to 5 seconds.

The second step of setting the class is first to compare the passenger's weight sensed by the weight sensor 30 with the first critical value 10 Kg, and the sensed passenger's weight continuance time with the reference continuance time 5 seconds (S120).

When the sensed passenger's weight is less than 10 kg and the passenger's weight continuance time is 5 seconds or more, the passenger identification unit 60 sets class 1 (S125). On the other hand, when the passenger's weight is 10 kg or more or the passenger's weight continuance time is less than 5 seconds, the passenger's weight is compared with the second critical value.

Since it is sensed that the passenger's weight is the first critical value or more in the previous step, the passenger's weight is compared with the second critical value 35 kg and the passenger's weight continuance time is compared with the reference continuance time 5 seconds (S130 and S140).

As a result of the comparison, when the passenger's weight is less than the second critical value 35 kg and the reference continuance time is 5 seconds or more, the passenger's weight is within a range between the first critical value 10 kg and the second critical value 35 kg; therefore, the passenger on the seat 2 is recognized as a child and class 1 is set (S135).

However, when the passenger's weight is the second critical value 35 kg or more and the passenger's weight continuance time is 5 seconds or more, the passenger on the seat 2 is recognized as an adult and class 2 is set (S145).

On the other hand, when the passenger's weight is the second critical value 35 kg or more but the passenger's weight continuance time is less than 5 seconds, the process returns to the start of the second step of setting a class and the second step is restarted.

After the class is set in the second step, the seat belt-fastening sensor 40 performs the seat belt-fastening sensing step that senses whether the passenger fastened the seat belt (S150).

When the seat belt-fastening sensor 40 senses that the passenger fastened the seat belt in the step of sensing whether the passenger fastened the seat belt, the passenger's weight is changed by fastening the seat belt, such that a load coefficient for the seat belt is added to the critical value that is the reference for setting a class in the second step to prevent the class set in the second step from frequently changing (S155).

The load coefficient, similar to the critical values and the reference continuance time, may be freely set by the user, and it is set such that a difference between the first critical value and the second critical value increases, and in this embodiment, the load coefficient is set to +4 kg and −6 kg.

The positive value of the load coefficients is given to the second critical value for discriminating class 1 from class 2 and the negative value is given to the first critical value for discriminating the class 0 from class 1, and accordingly, the first critical value becomes 4 kg and the second critical value becomes 39 kg.

The range for class 1 increases with the change in the critical value, such that it is possible to prevent frequent changes from class 2 to class 1 or from class 1 to class 0 due to various external factors.

After the load coefficients are given, a step of initially fixing the class set in the second step in accordance with the time the door 1 has been closed, which measured by the door-keeping-closed time measurer 21, and the time the seat belt has been fastened, which is measured by the seat belt-keeping-fastened time measurer 41 is performed (S160 and S165).

The step of initially fixing the class is first to compare the time that the door 1 has been closed, which is measured by the door-keeping-closed time measurer 21 with the reference closing continuance time (S160).

The reference closing continuance time is time that clearly shows whether the door 1 was opened or closed and can be freely set, and in the present invention, the reference closing continuance time is set to 5 seconds.

As a result of the comparison, when the time that the door 1 has been closed, which is measured by the door-keeping-closed time measurer 21 is less than 5 seconds, it is determined that the door 1 was opened and it is recognized that the class had been changed by the movement of the passenger on the basis of the opening of the door 1, such that the process returns to the second step of setting a class and the step of setting a class is restarted.

On the other hand, when the time that the door 1 has been closed, which is measured by the door-keeping-closed time measurer 21 is 5 seconds or more, it is recognized that the door 1 will not be opened anymore and the step of comparing the time that the seat belt has been fastened with a reference fastening time is performed (S165).

Similar to the reference closing time, the reference fastening time is time that clearly shows to the user whether the seat belt was fastened and may be freely set by the user, and in this embodiment, the reference fastening time is set to 5 seconds.

When the time that the seat belt has been fastened, which is measured by the seat belt-keeping-fastened time measurer 41, is less than the reference fastening time, 5 seconds, it is determined that the seat belt had been released.

When it is determined that the seat belt had been released, the load coefficient for the seat belt given in the previous step and the critical value should be changed. Accordingly, the process returns to the second step of setting a class and the second step of setting a class is restarted.

However, when the time that the seat belt has been fastened, which is measured by the seat belt-keeping-fastened time measurer 41, is the reference fastening time, 5 seconds or more, it is definitely determined that the seat belt was fastened and the set class is initially fixed (S175), and then a step of finally fixing the initially fixed class in accordance with the traveling speed of the vehicle is performed (S180).

Although the step of initially fixing the class set in the second step can be determined on the basis of the time that the door 1 has been closed and the time that the seat belt has been fastened or released, as described above, because the vehicle can be driven with the passenger not fastening the seat belt, the step (S165) determined on the basis of the time that the seat belt has been fastened or released may be omitted.

Meanwhile, when the seat belt-fastening sensor 40 senses that the passenger does not fasten the seat belt in the step of sensing whether the seat belt was fastened or not, a step of initially fixing the set class on the basis of the time that the door 1 has been closed is performed (S170).

The time measured by door-keeping-closed time measurer 21 of the door 1 is compared with the reference closing continuance time in order to perform the step of initially fixing the class on the basis of the time that the door 1 has been closed.

The reference closing continuance time is set to 5 seconds, similar to when it is sensed that the seat belt was fastened, and when the time that the door 1 has been closed, which is measured by the door-keeping-closed time measurer 21 is less than the reference closing continuance time, 5 seconds, it is recognized that the class set in the second step would have been changed by opening the door 1, such that the process returns to the second step.

On the other hand, when the time that the door 1 has been closed, which is measured by the door-keeping-closed time measurer 21 is 5 seconds or more, it is recognized that the door 1 will not be opened anymore and the class set in the second step is initially fixed (S175).

Further, since the seat belt-fastening sensor 40 senses that the seat belt was not fastened in the step of sensing whether the seat belt is fastened, the door 1 keeps closed and the class is initially fixed, the step of initially fixing the class on the basis of the time that the seat belt has been fastened is omitted, and the step of finally fixing the class initially fixed in accordance with the traveling speed of the vehicle.

In the step of finally fixing the class, a reference fixed speed that is the reference for finally fixing the class in accordance with the traveling speed, which is measured by the vehicle speed sensor 50, is set.

The reference fixed speed can be freely set by the user as a speed where it is sensed that the vehicle is traveling on the road. According to an embodiment of the present invention, the reference fixed speed is set to 10 km/h.

After the class set in the second step is initially fixed, the vehicle speed sensor 50 in the vehicle measures the traveling speed of the vehicle. When the traveling speed of the vehicle measured by the vehicle speed sensor 50 is the reference fixed speed 10 km/h or more than the reference fixed speed, the passenger identification unit 60 recognizes that the vehicle is traveling on the road and finally fixes the initially fixed class (S185).

However, when the traveling speed of the vehicle measured by the vehicle speed sensor 50 is less than the reference fixed speed 10 km/h, the passenger identification unit 60 recognizes not that the vehicle is traveling on the road, but that the vehicle may stop and returns to the steps before the step (S150) of sensing whether the seat belt was fastened.

After the class is finally fixed in the step of finally fixing the class, the passenger identification unit 60 transmits the finally fixed class to the airbag-deployment unit that controls deployment of the airbags (S190).

In the process of passenger identification operation described above, since various conditions are set for passenger identification, it is possible to achieve a more accurate result of passenger identification by preventing errors in the passenger identification.

Further, the airbag-deployment unit deploys the airbags 71, 72, 73, and 74 to protect the passengers in the vehicle when a collision occurs while the vehicle travels, in which the airbag-deployment unit can control the airbag deployment size on the basis of the finally fixed class transmitted from the passenger identification unit 60, such that it is possible to not only more safely protect the passengers by fitting the airbags to the types of passengers, but prevent the passengers from being additionally hurt when the airbags are deployed wrong, other than the collision.

Although the present invention was described above with reference to the embodiment shown in the drawings, this is just an example, and the present invention is not limited to the embodiment and the drawings and may be modified in various ways within the scope of the present invention by those skilled in the art. Accordingly, the actual technical protection scope of the present invention must be determined by the spirit of the appended claims.

What is claimed is:

1. A method of identifying a passenger sitting on a seat of a vehicle, comprising:
    sensing, by a weight sensor, a weight of the passenger in the seat;
    measuring, by a weight-keeping-exerted time measurer, a weight continuance time which measures a duration of the sensed passenger's weight being exerted;
    setting, by a passenger identification unit, a class of the seat by using the weight of the passenger sensed by the weight sensor and the weight continuance time;
    sensing, by a seat belt-fastening sensor, whether a seat belt in the vehicle is fastened after said setting the class;
    changing, by the passenger identification unit, a critical value that is a reference for setting the class when the seat belt-fastening sensor senses that the seat belt is fastened;
    after said changing a critical value, measuring, by a door-keeping-closed time measurer, a door closing continuance time which measures the duration of a door being closed;
    measuring, by a seat belt-keeping-fastened time measurer, a fastened time that the seat belt has been fastened when the door closing continuance time measured by the door-keeping-closed time measurer is greater than a reference closing continuance time;
    initially fixing the set class by the passenger identification unit, when the fastened time measured by the seat belt-keeping-fastened time measurer is greater than a reference fastening time;
    after said initially fixing the set class, sensing a traveling speed of the vehicle by a vehicle speed sensor; and
    finally fixing the set class by the passenger identification unit when the traveling speed of the vehicle is greater than a fixed reference speed, wherein,
    said step of setting the class of the seat is restarted when the door closing continuance time is less than the reference closing continuance time, and
    said step of setting the class of the seat is restarted when the fastened time is less than the reference fastening time.

2. The method of identifying a passenger according to claim 1, further comprising controlling an airbag that deploys in a collision, by using the finally fixed class.

3. The method of identifying a passenger according to claim 1, wherein the set class is one of a plurality of classes and the plurality of classes include:
    class 0 that recognizes that the seat is vacant;
    class 1 that recognizes that the passenger in the seat is a child; and
    class 2 that recognizes that the passenger in the seat is an adult.

4. The method of identifying a passenger according to claim 3,
    wherein the passenger identification unit compares the weight of the passenger with a plurality of critical values to set the class,
    wherein the plurality of critical values include a first critical value for discriminating class 0 from class 1 and a second critical value for discriminating class 1 from class 2.

5. The method of identifying a passenger according to claim 1, further comprising sensing, by a door opening/closing sensor, whether the door of the vehicle is open or closed, wherein the passenger identification unit sets the class if it is sensed that the door is closed by the door opening/closing sensor.

* * * * *